May 24, 1932.  H. C. STOCKHAM  1,859,852
RETURN BEND FITTING
Filed Dec. 4, 1930
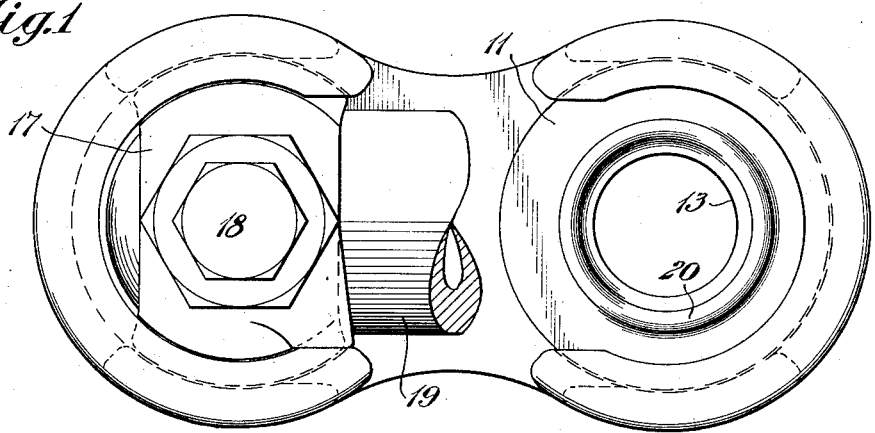
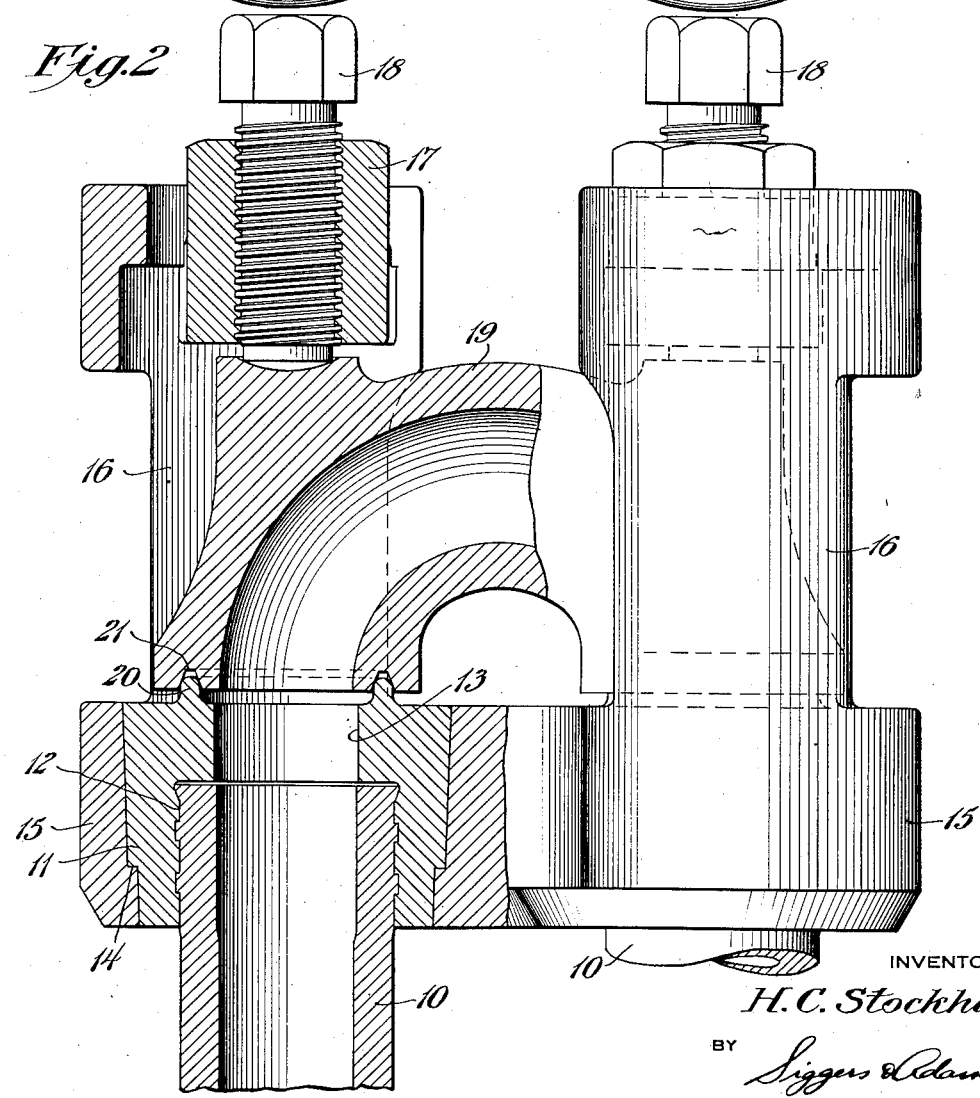
INVENTOR
H. C. Stockham
BY
Siggers & Adams
ATTORNEYS Patented May 24, 1932

1,859,852

UNITED STATES PATENT OFFICE

HERBERT C. STOCKHAM, OF BIRMINGHAM, ALABAMA, ASSIGNOR TO FRED C. FANTZ, OF WEBSTER GROVES, MISSOURI

RETURN BEND FITTING

Application filed December 4, 1930. Serial No. 500,115.

This invention relates to return bends for tubular oil stills and the like and, among other objects, aims to provide an improved return bend fitting or assembly of the type wherein fittings or collars are secured to the ends of a pair of tubes and a yoke is mounted on said fittings to clamp the U-piece in place. Further, the invention provides improved joints between the U-piece and the collars. The idea is to provide a strong, durable and relatively cheap fitting capable of withstanding high pressures and temperatures and the ordinary abuses to which such equipment is subjected.

Other aims and advantages of the invention will appear in the specification, when considered in connection with the accompanying drawings, wherein:

Fig. 1 is a top plan view, partly broken away, showing one embodiment of the invention; and Fig. 2 is a side elevation, partly in section, showing the preferred form of fitting applied to a pair of tubes.

Referring particularly to the drawings, the illustrated form of fitting 11 there shown is applied to the ends of a pair of parallel tubes 10 such as are used in tubular oil stills. In this example, the ends of the tubes are rolled into these annular collars or fittings 11 shown as having counterbores 12 of the proper depth to provide a good joint. The outer end portions have smaller openings or bores 13 of about the same diameter as the internal diameter of the tubes.

The collars or fittings provide means for securing a unitary yoke or separable yoke pieces with respect to the tubes. Herein, the outer walls of the collars are frusto-conical and present annular shoulders 14. They are adapted to fit more or less loosely in correspondingly shaped shouldered sockets in yoke pieces 15 which are preferably, though not necessarily, integrally connected. The arrangement is such that the yoke pieces may be slipped inwardly to disengage them from the collars or fittings or to permit the tubes to be adjusted by rotation when they sag or have badly burned places on the side next to the fire. Furthermore, a single tube can be cut off and the pieces with their collars removed through opposite yokes without disturbing any other tube, thereby permitting the replacement of a single damaged tube in a short time.

The yoke is here shown as having integral pairs of arcuate side walls 16 to the outer ends of which suitable toggles 17 carrying set screws 18 are removably secured. The particular design of the yoke walls and the type of toggles may be widely varied. They are used to clamp the U-piece or bend 19 against the outer faces of the collars or fittings 11 (Fig. 2).

To permit easy removal of the U-piece for the purpose of cleaning or reaming out the tubes, the end faces of the U-piece and the collars or flanges have tongue and groove joints of such construction that they cannot stick or "freeze" together due to any adhering coke. In this example, the outer faces of the collars or flanges have annular tongues 20 concentric with the axes of the tubes and the ends of the U-piece have substantially V-shaped grooves 21 engaging the tongues. The construction is such as to permit adequate tightening adjustments without binding. In some instances, it may be desirable to reverse the arrangement of the tongues and grooves. However, the tongues can very easily be machined on the collars in an automatic lathe.

From the foregoing description, it will be seen that the improved return bend can be manufactured at a relatively low cost. All of the parts can easily be applied to tubes by ordinary mechanics in the field. No special machine operations on the tubes are required. The tubes can be adjusted by rotation independently of each other and a tube can be replaced without disturbing another, and without damaging a yoke or yoke piece as the case may be. Moreover, any tube collar which may be damaged by chipping out the expanded end of a tube can be replaced by a new one at very little expense and without any great loss of time. The improved joints between the U-piece and the collars can be kept tight after they are worn and will never stick due to coking.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

In a refinery apparatus, means for connecting a conventional return bend to a pair of still tubes, comprising a fitting having an opening corresponding to the external diameter of said tubes, the walls of said opening being provided with circumferential recesses adapted to receive the metal of the tubes when they are expanded therein, an inwardly extending flange at one end of said fitting forming an opening the same diameter as the internal diameter of said tubes, shoulders on the outer surface of said fittings, a housing member having substantially circular openings therein, the walls of which are adapted to interlock with the shoulders on said fittings, means forming a leak-proof joint between the face of the return bend and the end of said fitting, comprising a groove on one member and a rib on the other, and means carried by said housings for holding said fittings and said return bend in assembled relation to form a gas-tight joint.

In testimony, that I claim the foregoing as my own, I have hereto affixed my signature.

HERBERT C. STOCKHAM.